Jan. 10, 1950 D. F. CARIS ET AL 2,494,429
GYRO PRECESSING MEANS

Filed March 12, 1945 6 Sheets-Sheet 1

Inventors
Darl F. Caris &
Wallace W. Perkins
By Blackmore, Smart & Flint
Attorneys Jan. 10, 1950 — D. F. CARIS ET AL — 2,494,429
GYRO PRECESSING MEANS
Filed March 12, 1945 — 6 Sheets-Sheet 2

Inventors
Darl F. Caris &
Wallace W. Perkins
By Blackmore, Spencer & Flint
Attorneys

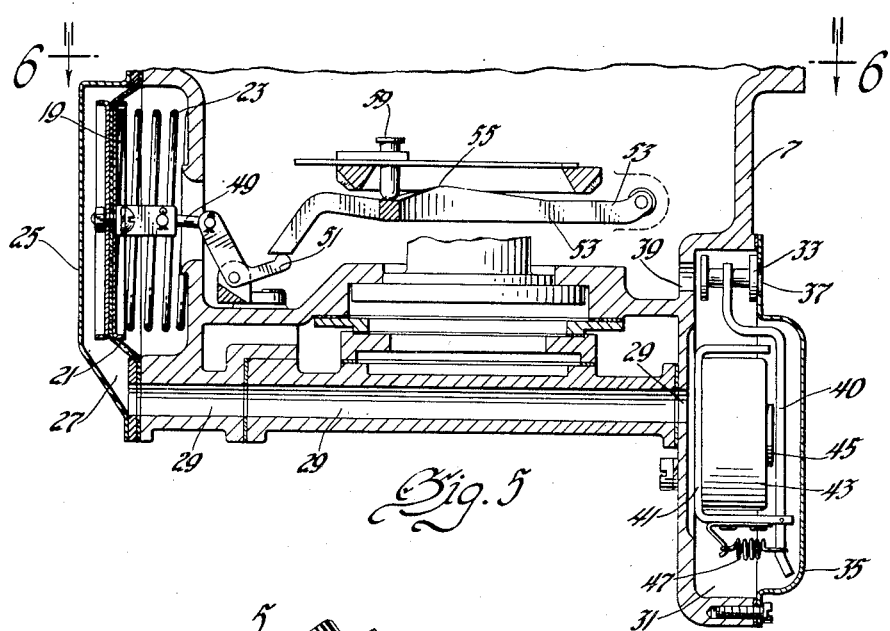

Jan. 10, 1950  D. F. CARIS ET AL  2,494,429
GYRO PRECESSING MEANS
Filed March 12, 1945  6 Sheets-Sheet 4

Inventors
Darl F. Caris &
Wallace W. Perkins
By
Blackmore, Spencer & Flint
Attorneys

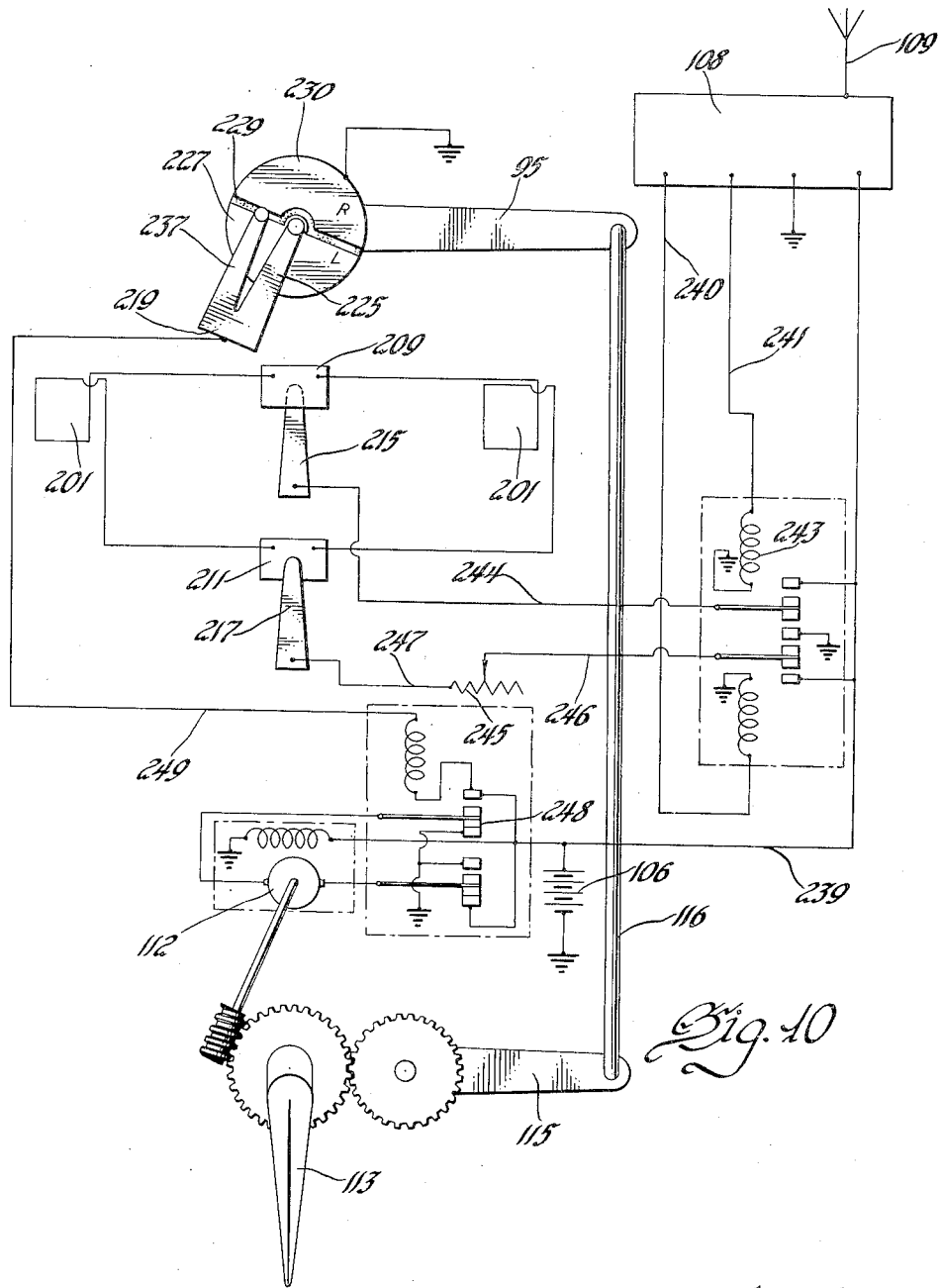

Patented Jan. 10, 1950

2,494,429

UNITED STATES PATENT OFFICE 2,494,429

GYRO PRECESSING MEANS

Darl F. Caris, Dearborn, and Wallace W. Perkins, Pleasant Ridge, Mich., assignors to General Motors Corporation, Detroit, Mich., a corporation of Delaware Application March 12, 1945, Serial No. 582,338

6 Claims. (Cl. 74—5.4)

The present invention generally relates to directional controlling mechanisms and more particularly relates to remotely controlled gyroscopic directional control means for vehicles or ships.

The principal object of the invention is to provide a simple remotely controlled gyroscopic directional control mechanism for an airborne ship.

Another object is to provide remotely controlled electromagnetic precessing means for gyroscopic control means to provide preselected uniform precession rates and exerting no additional force or friction between other parts of the gyroscope thereby preventing errors in the gyroscopic action and enabling simple power operated steering and follow-up mechanism to be connected to and controlled by the gyroscopic control means.

Another object of the invention is to provide power operated and remotely controlled centering and caging mechanism for the gyroscopic control means.

The combined means by which the above objects are accomplished and other features of the invention will become apparent by reference to the following detailed description and drawings illustrating two different forms of control systems.

Figure 1 is taken substantially on line 1—1 of Figure 6.

Figure 5 is an enlarged partial cross-sectional elevation view taken on line 5—5 of Figure 6 with parts broken away.

Figure 6 is an enlarged cross-sectional view taken on line 6—6 of Figure 5.

Figure 10 is a similar view of the vehicle directional control system using the gyroscope shown in Figures 6 to 8.

Figure 1:
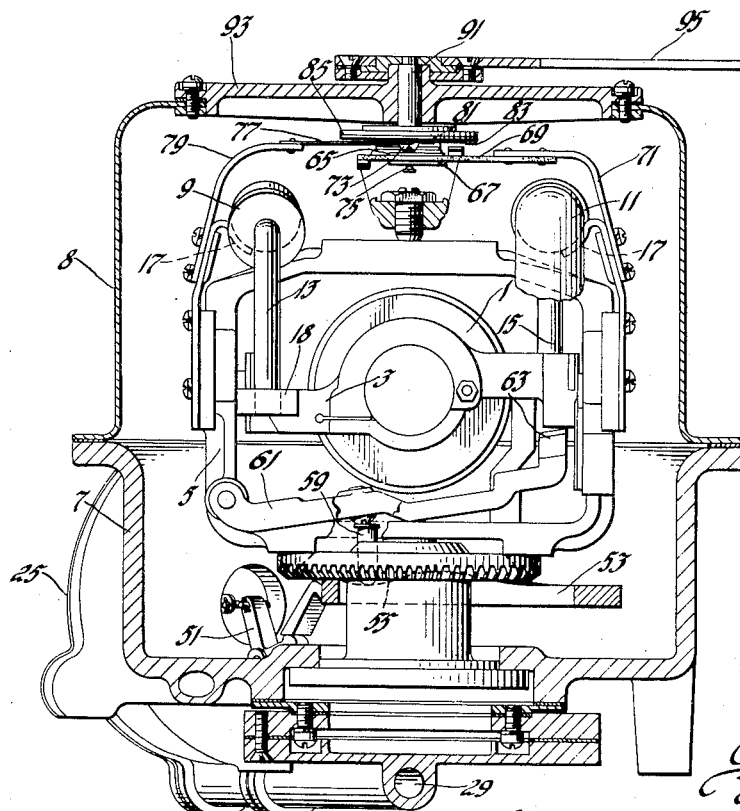
Figures 1 and 2 are vertical sectional elevation views, taken at right angles to each other, of one form of gyroscope with parts broken away.
Figure 2:
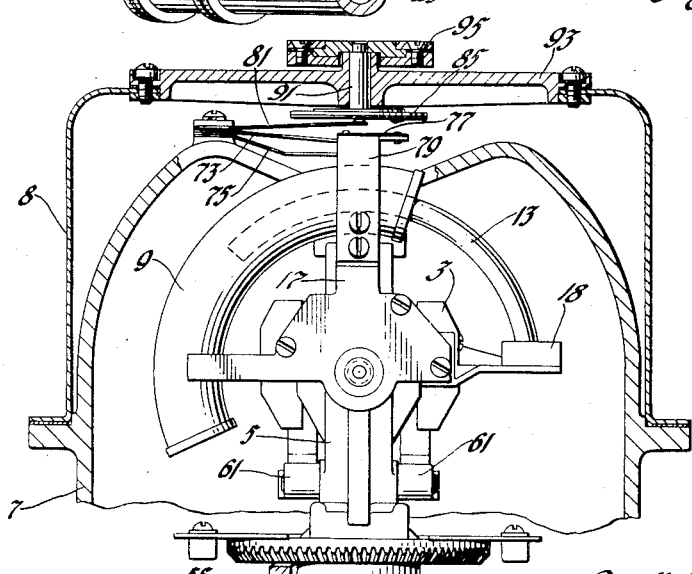
Figure 3:
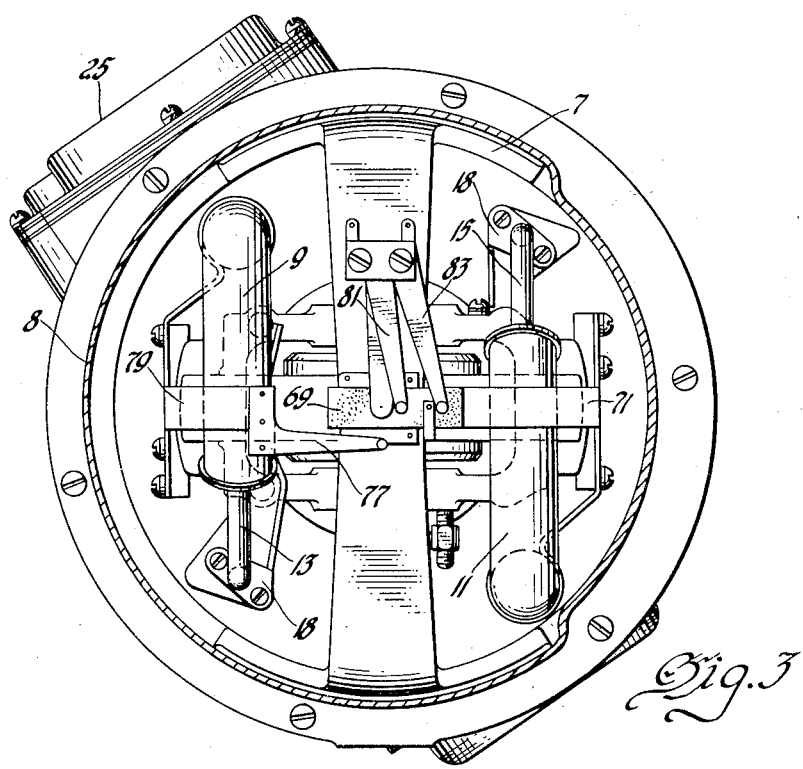
Figure 3 is a plan view of the gyroscope shown in Figures 1 and 2 with parts broken away and in section.
Figure 4:
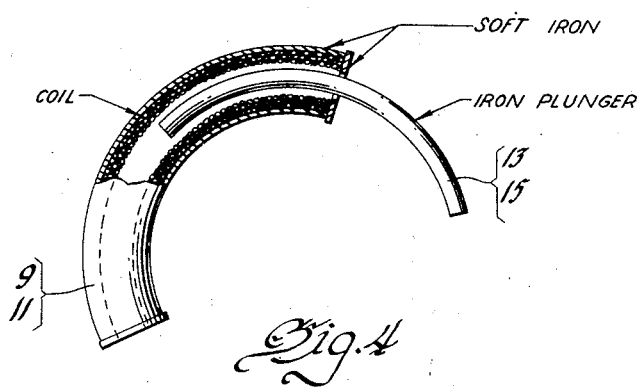
Figure 4 is an enlarged schematic elevation view of the electromagnetic means for causing precessing of the gyroscope shown in the preceding figures.

The gyroscope, shown in Figures 1 to 3, is provided with a rotor 1 which is adapted to rotate about a horizontal axis in an inner gimbal member 3 which is pivoted about an axis in the same plane and at right angles to the rotor axis in an outer gimbal member 5. The outer gimbal member is pivoted about a vertical axis to a gyroscope housing 7 provided with a housing cap member 8. The housing 7 is adapted to be secured to a vehicle so that the steering mechanism thereof is under control of the gyroscope.

The gyroscope rotor 1 is driven in conventional manner by an air nozzle on the inner gimbal for driving blades on the rotor in a well known manner. The interior of the housing 7 is connected to a suitable source of subatmospheric pressure and air at atmospheric pressure is supplied to the air nozzle through connecting passages including a filter, not shown, located in the housing and gimbal members.

Electrically controlled means are provided to control precession of the gyroscope in either direction about a vertical axis. These means include ironclad solenoids 9 and 11 of arcuate form and separate arcuate plungers 13 and 15, each of which is freely movable in and is attracted by a separate solenoid. The solenoids are secured by means of brackets 17 to outer ends of the outer gimbal member with the axis of each arranged at right angles and concentric to the horizontal axis of the inner gimbal. The arcuate plungers are also arranged at right angles and concentric to the horizontal axis of the inner gimbal so that the free end of each is freely movable in a respective solenoid. One terminal of each of the solenoid windings are grounded to the brackets 17. The arcuate plungers 13 and 15 are secured by means of brackets 18 to the diagonally opposite portions of the inner gimbal 3, as best shown in Figure 3. With the plungers and ironclad solenoids arranged in this manner constant pull is exerted on each plunger to cause constant torque to be applied in either direction between the gimbal members and transverse to their respective axes in order to cause a substantially constant rate of precession of the rotor and gimbals in either direction about a vertical axis. Also with the ironclad solenoid construction no magnetic leakage to the other parts of the gyroscope takes place and hence no magnetic leakage and no forces are applied to these other parts to cause friction therebetween.

The gimbals may be centered and caged, in the positions shown, by the mechanism shown in Figures 5 and 6. A diaphragm 19 is clamped across an opening in the housing and a plunger 21 is secured thereto with a spring 23 between it and a housing flange to urge it outwardly of the housing. A housing closure plate 25 serves to form a cavity 27 adjacent the outer surface of the diaphragm. A connecting passage 29 in the housing connects the cavity 27 to a valve cavity 31 in the housing, including an electromagnetically operated centering caging valve 33. The valve cavity 31 is closed by a cover plate 35 having an atmospheric opening 37 and a housing passage 39 in alignment with the opening 37 is shown extending extending between the valve cavity and the interior of the housing which, as previously described, is maintained at subatmospheric pressure. The valve 33 is supported on an armature 40 which is fulcrumed on one leg of a U-shaped outer pole 41 of an electromagnet having a winding 43 on a central pole piece 45. A spring 47 normally urges the armature so that the valve 33 covers the atmospheric opening 37 so that air at subatmospheric pressure is applied on both sides of the diaphragm and the diaphragm and plunger are normally urged outwardly toward the cover plate 25 by the plunger spring 23. Energization of the electromagnet winding 43 causes the armature 40 to be moved from the normal position to cause the valve 33 to close the passage 39 and uncover the atmospheric opening 37 so that atmospheric pressure is applied to the outer surface and air at subatmospheric pressure is applied to the inner surface of the diaphragm to cause inward movement of the plunger and diaphragm against the force of the spring 23. The plunger 21 is connected by a link 49 and a bell crank 51, pivoted to the housing, to one end of a bifurcated centering lever 53, the legs of which are also pivoted to the housing. The centering lever is provided with cam surfaces 55 and 57 on each leg and sloping downwardly to the junction of the legs so that upon outward movement of the plunger 21 the centering lever is raised and the cam surface of either leg engages the lower ball end of a centering pin 59 supported for vertically sliding movement in the lower portion of the outer gimbal 5 and the upper end of the pin is accordingly moved upwardly into contact with a "U" shaped caging lever 61 pivoted at one end to the outer gimbal 5 for vertical movement with respect thereto to cause the caging lever to be moved upwardly. The other ends of the caging lever 61 are provided with surfaces 63 which are adapted to engage complementary lower surfaces on the inner gimbal member 3 to cause it to be rotated to and held in a caged horizontal plane. It will be evident with this arrangement of electromagnetic caging and centering mechanism that when the electromagnet winding 43 is deenergized the centering lever 53 is raised by the plunger 21 and the contact of the lower ball end of the pin 59 with the cam surface on either leg of the centering lever 45 and contact between the upper end of the pin with the caging lever 61 causes the outer gimbal to be rotated in either direction about its vertical axis to the centered position, as shown, and also causes the inner gimbal to be rotated in either direction about its horizontal axis to the horizontal caged position shown.

Energization of either of the precessing solenoids 9 or 11 to cause precession of the inner and outer gimbals in either direction about the vertical axis takes place through two electrical contact plates 65 and 67 secured on opposite sides of an insulator 69 which is secured by a bracket 71 to the outer gimbal and through two spring contacts 73 and 75 shown in contact with each of the plates at a point located on the vertical axis of this gimbal. The outer ends of the spring contacts are secured to the housing by suitable insulators. With this arrangement of contacts minimum friction and no torque is applied when the outer gimbal rotates relative to the housing. Another spring contact 77 is secured to and grounded electrically on the outer gimbal by a bracket 79. Two other spring contacts 81 and 83 supported by suitable insulators to the housing, are adapted to engage contact disks 85 and 87 of semicircular form, best shown in Figure 9, secured to a disk 89 of insulating material secured on a shaft 91 rotatably mounted in a vertical opening coaxial with the outer gimbal axis in a closure member 93 secured to the upper face of the housing cap 3. The above described contacts serve as reversing controlling means for power operated vehicle steering means to be subsequently described, which means is also connected to an arm 95 secured on the shaft 91 by which the contact disks 85 and 87 are rotated.

Figure 9:
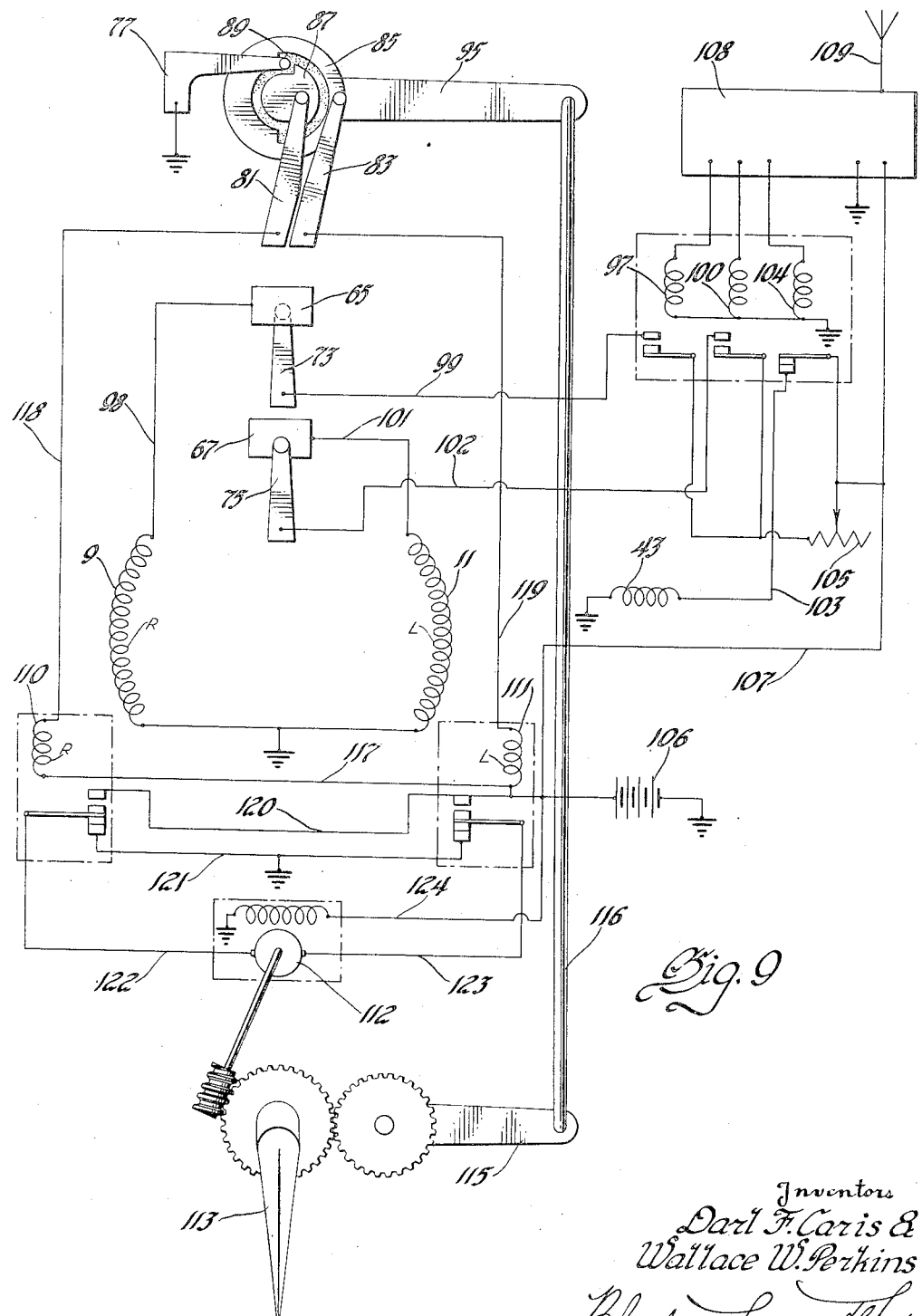
Figure 9 is a schematic view of the vehicle direction control system using the gyroscope of the form illustrated in Figures 1 to 4.

The directional control system including the above described gyroscope and the electrical control connections between the elements of this system are shown schematically in Figure 9. The control system is shown controlling a steering rudder for an aeroplane but is suitable for other vehicles.

The ungrounded winding terminal of the solenoid 9 is shown connected through the contacts 65 and 73 to the fixed contact of a relay 97 by wires 98 and 99 and the ungrounded winding terminal of the other solenoid 11 is connected through the contacts 67 and 75 to the fixed contact of a relay 100 by wires 101 and 102. One terminal of the winding 43 of the electromagnetic centering and caging valve is grounded and the other terminal is connected by a wire 103 to the fixed contact of a relay 104. The armature contacts of the relays 97 and 100 are connected in series with a rheostat 105 to the positive terminal of a battery 106 by a wire 107 and the negative battery terminal is grounded. The rheostat 105 may be adjusted to vary the current in the solenoids to obtain preselected values of precession rate of the gyroscope. The armature contact of the relay 104 is connected directly to the positive wire 107. One terminal of each of the relay windings is grounded and each of the other winding terminals is connected to separate output terminals of a radio receiver 108 provided with an antenna 109 and having one input terminal grounded and the other input terminal connected to the positive wire 107.

The receiver 108 includes suitable filter amplifier equipment to cause selective energization of the relays 97, 100 and 104 when different frequency radio signals are picked up by the radio antenna 109 from a broadcasting station, so that precession and caging of the gyroscope may be remotely controlled.

The grounded contact 77 carried by the outer gimbal upon precession of the outer gimbal clockwise, as shown in Figure 9, upon energization of the solenoid 9 moves into contact with the contact disk 87 and moves in the opposite direction into contact with the contact disk 85 when the solenoid 11 is energized to cause precession in the opposite direction, to complete a circuit to ground through one or the other of two control relays 110 or 111 serving to control reversal of the power steering means of the vehicle. This power means comprises a separately excited motor 112 connected by suitable irreversible gearing to a rudder 113. The rudder is shown connected by suitable gearing to an arm 115 connected by a link 116 to the arm 95 connected to the shaft 91 and the contact disks 85 and 87 carried thereby in order to cause rotation thereof about the vertical axis of the outer gimbal in a reverse direction to that of the rudder.

The lower terminals of the winding of the relay 110 and 111 are connected together by a wire 117 which is connected to the positive wire 107. The upper terminal of the winding of the relay 110 is connected by a wire 118 to the contact 81 carried by the housing and the other housing contact 83 is connected by a wire 119 to the other winding terminal of the relay 111. The upper fixed contacts of the relays 110 and 111 are connected together by a wire 120 which is also connected to the positive wire 107 and the lower fixed relay contacts on which the relay armature contacts normally bear are connected together and grounded by a wire 121. Each relay armature contact is connected to one terminal of the motor armature by separate wires 122 and 123 and the armature is accordingly normally short-circuited to ground as the armature contacts normally bear on the lower fixed contacts. The motor field winding is connected between ground and the positive wire 107 by a wire 124 and is accordingly normally energized. It will be evident that with the armature short-circuited to ground and the motor field winding energized the armature will be promptly brought to rest by the dynamic braking action between the motor field and armature windings.

It will be evident that upon energization of either of the windings and closure of the contacts of the relays 97 or 100 upon pick-up of a signal of a given frequency by the radio receiver 108 one or the other of the solenoids 9 or 11 will be energized to cause precession of the outer gimbal of the gyroscope.

With the ship traveling on a straight course at right angles to the axis of the gyroscope rotor and the grounded contact 77 on the outer gimbal positioned on the portion of the insulating disk 89 between the contact disks 85 and 87 thereon, the operation of the control system will be as follows should the ship tend to deviate from this course. Should the ship deviate to the left of the course setting the contact disks 85 and 87 through their connection with the ship's rudder 113 will rotate counterclockwise about the vertical axis of the gyroscope and cause the contact disk 87 to engage the grounded outer gimbal contact 77. This completes an energizing circuit to the winding of relay 110 to ground through wires 107, 117 and 118. The armature contact of the relay 110 will accordingly be moved upwardly into contact with the upper fixed contact to cause energization of the motor armature through these relay contacts and wires 107, 122 and 123 to ground through the normally closed contacts of the relay 111 and wire 121. This causes counterclockwise rotation of the rudder 113 by the motor to cause the ship to turn to the right and compensate for the counterclockwise deviation of the ship from the course. The arm 115 geared to the rudder will be rotated clockwise and cause clockwise rotation of the arm 95 and contact disks through the link 116 connecting the arm 95 to the arm 115. This causes the contact disk 87 to be moved off the gimbal contact 77 and cause deenergization of the winding of the relay 110 which causes its armature to drop to the normal position and cause deenergization of the armature of the motor and shorting thereof to stop rotation of the motor and rudder. The ship accordingly turns clockwise with reference to the gyroscope and if it deviates to the right of the course the contact disk 85 will move into contact with the grounded gimbal contact 77. This causes energization of the winding of the relay 111 through wires 107, 117 and 119 and to ground through the contact disk 85 and grounded gimbal contact 77. The armature contact of the relay 111 accordingly is moved upwardly into contact with the upper fixed contact upon energization of the winding to complete a circuit through the motor armature in the reverse direction through wires 107, 123 and 122 and to ground through the normally closed contacts of the relay 110 and wire 121. This causes clockwise rotation of the rudder to cause counterclockwise turning of the ship back to its original course and the contact disks are turned counterclockwise to cause the contact disk 85 to move out of contact with the grounded gimbal contact 77 and break the above circuit connections to promptly stop rotation of the motor and rudder. The vehicle is accordingly brought back on course by any turning movement of the vehicle in either direction with respect to the gyroscope by slight rotation of the rudder in either direction to connect for such deviations.

To alter the course of the vehicle radio signals of different frequencies are transmitted and are picked up by the receiver 108. One signal frequency causes energization of the winding and closure of the contacts of the relay 97 to cause energization of the solenoid 9 and precession of the gyroscope clockwise about the vertical axis. This causes the grounded outer gimbal contact 77 to move into contact with the disk contact 87 and cause energization of the relay 110 and motor 112 to cause counterclockwise movement of the rudder and turning of the vehicle to the right or clockwise and the turning of the arms 115, 95 and contacts clockwise to break these connections and stop movement of the rudder when the insulating portion of the disk 89 lines up with the contact on the end of the grounded outer gimbal contact 77 in the new course setting as determined by the gyroscope. The vehicle is then held in the new course setting in the previously described manner.

A different frequency of radio signal received by the receiver 108 causes energization of the winding and closure of the contacts of the relay 100 to cause energization of the solenoid 11. This causes precession of the gyroscope counterclockwise about the vertical axis and this causes the grounded outer gimbal contact to move counterclockwise into contact with the contact disk 85 so that the relay 111 and motor is energized to cause turning of the rudder so that the vehicle turns to the left or counterclockwise to the new course where it is again held in the previously described manner.

A third frequency of radio signal received by the receiver causes energization of the winding and the opening of the normally closed contacts of the relay 104 to cause deenergization of the winding of the centering and caging valve winding 43 and this causes centering and caging of the gyroscope in the previously described manner.

It will be evident that with the above arrangement that when the ship is in the course set the grounded outer gimbal contact is on the portion of the insulating disk 89 between the disk contacts 85 and 87 which causes the shorted motor to stop the rudder in the straight fore and aft position.

The ironclad precessing solenoids 9 and 11 and the poles of the electromagnet operating the centering and caging valve 33 are designed to prevent leakage flux reaching other parts of the gyroscope in order to prevent errors in the operation thereof.

Figure 7:
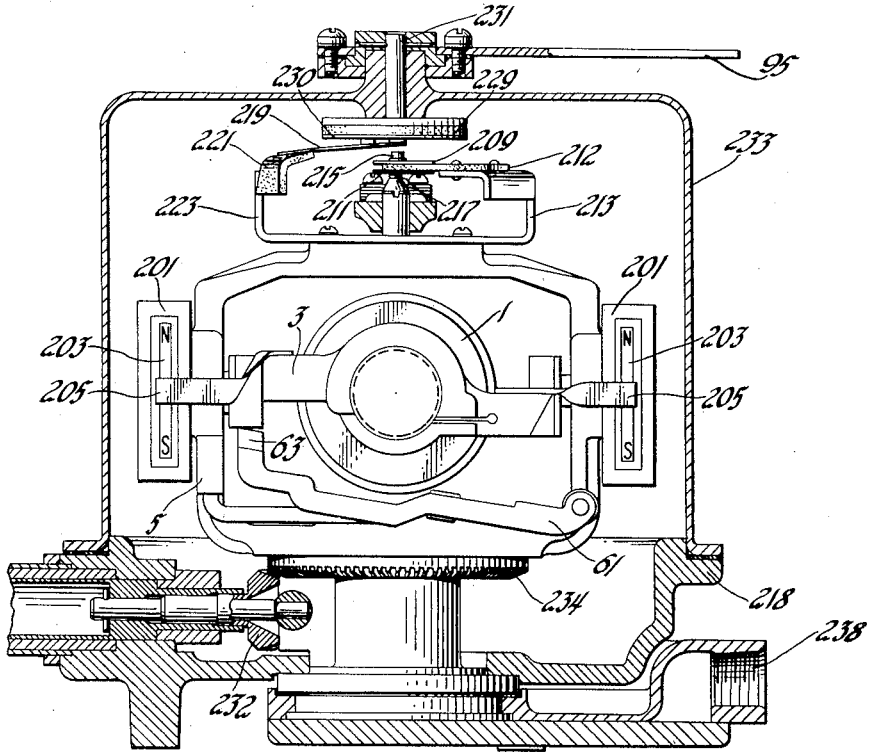
Figures 7 and 8 are elevation and plan views of another form of gyroscope with parts broken away and in section.
Figure 8:
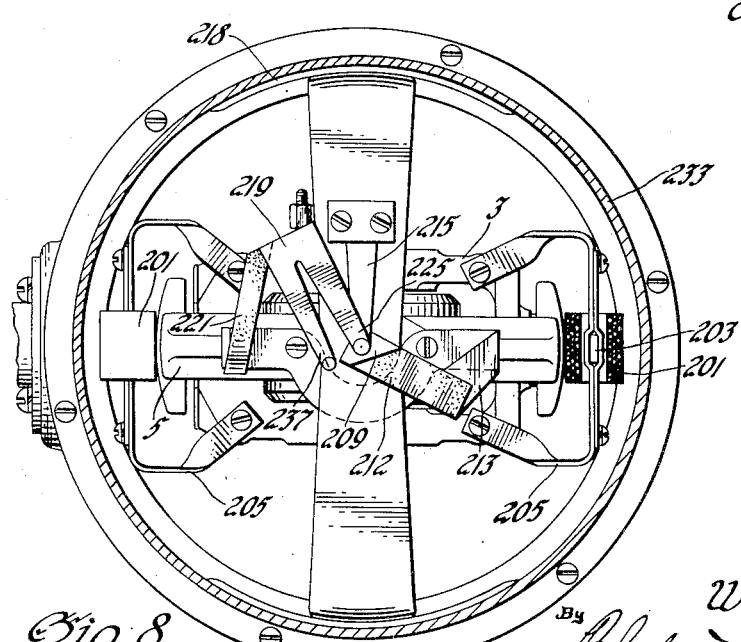

The form of gyroscope shown in Figures 7 and 8 is similar to that previously described except for the precessing means and the housing which includes conventional manually operable caging and outer gimbal adjusting means.

The precessing means shown in Figures 7 and 8 for this gyroscope which is included in a slightly different form of directional control system, shown schematically in Figure 10, includes electromagnetic windings 201 of rectangular form secured on opposite ends of the outer gimbal 5 with the axes of the windings horizontal and permanent magnets 203, of bar form secured by means of brackets 205 to opposite ends of the inner gimbal 3 so that each magnet rotates freely in each winding with the longitudinal center line of each of the magnets located transversely to the horizontal axis of the rotor and the transverse center line of each of the magnets arranged coaxial with the horizontal axis of the inner gimbal and transversely to the axis of each winding.

Each of the windings 201 are electrically connected between two contact plates 209 and 211 secured on opposite sides of an insulator 212 which is secured by means of a bracket 213 to the outer gimbal 5. Two spring contacts 215 and 217 are secured by suitable insulators to the housing 218 of the gyroscope so that each of the spring contacts engage one of the contact plates at a point located coaxial with respect to the vertical axis of the outer gimbal. A bifurcated spring contact 219 is carried by an insulator 221 which is secured by means of a bracket 223 to the outer gimbal 5. One leg 225 of the contact 219 is adapted to bear at a point located coaxial with the vertical axis of the outer gimbal on the undersurface of a contact disk 227 of semicircular form secured on an insulating disk 229 which is secured to a shaft 231 rotatably supported in an opening located coaxial with the outer gimbal in a cap 233 of the gyroscope housing 218. The other leg 237 of the contact 219 is adapted to contact the disk contact 227 and also the undersurface of another semicircular contact disk 230 also secured to the insulated disk, as best shown in Figure 10. The shape of these disk contacts and their arrangement on the insulating disk 229 is such that rotation of the outer gimbal and contact 219 thereon in either direction causes the leg 237 thereof to contact one of the contact disks before breaking contact with the other to provide a hunting type of directional control for the power operated steering mechanism.

The shaft 231 is connected to the rudder gearing in identical manner to that described previously.

The caging mechanism of this gyroscope is manually operable and comprises a pinion gear 232 adapted to be engaged with a gear 234 on the outer gimbal 5 to rotate it and at the same time to operate the caging lever 61 in a well known manner to cause the inner gimbal to be rotated so that the axis of the rotor is moved to and caged in a position transverse to the axis of the outer gimbal as best shown in Figures 7 and 8. Rotation of the pinion gear 232 while meshed with the gear 234 on the outer gimbal causes rotation thereof about its axis to vary the course setting of the gyroscope. The opening 238 in the housing 218 is connected to a source of sub-atmospheric pressure to cause rotation of the gyroscope rotor in the manner previously described.

The control system, shown schematically in Figure 10, of which this second form of gyroscope precessing means forms a part includes the same type of radio receiver and power steering and follow-up mechanism as previously described but the control connections are modified to provide a hunting action of the steering mechanism.

One input terminal of the radio receiver 108 is connected by a positive wire 239 to the positive terminal of the battery 106, the negative terminal of which is grounded as is the other input receiver terminal. Two of the receiver output terminals are each connected by separate wires 240 and 241 to one terminal of separate windings of a relay 243 serving to reverse the current through the gyroscope precessing windings 201. The upper and lower fixed contacts of the relay 243 are connected to the positive wire 239, the central fixed relay contact is grounded, one relay armature contact is connected to the spring contact 215 on the gyroscope housing by a wire 244 and a rheostat 245 is connected in series between the other relay armature contact and the spring contact 217 of the gyroscope by means of wires 246 and 247. The upper and lower fixed contacts of the relay 248 and one terminal of the field winding of the steering motor 112 are connected to the positive wire 239. The other terminal of the motor field winding and the two central contacts of the relay 248 are grounded. The motor armature is connected between the armature contacts of the relay 248 and the relay field winding is connected between the upper fixed relay contact and the spring contact 219 in the outer gimbal by a wire 249.

The operation of the control system is as follows when the gyroscope is set for a course shown by the position of the rudder 113 in Figure 10. The motor field is continuously energized and the current is reversed through the motor armature by the reversing relay 248. When the ship turns slightly to the right of the course setting the two contact disks 227 and 230 are turned clockwise with respect to the outer gimbal contact 219 and the two legs of this contact are then in contact with the ungrounded contact disk 227 to open the circuit to the winding of the motor reversing relay 248 so that the relay contacts are in the position shown. This causes energization of the motor 112 through the normally closed relay contacts to cause rotation of the rudder clockwise to cause the ship to turn left or counterclockwise. The clockwise rotation of the rudder and counterclockwise rotation of the ship causes clockwise rotation of the contact disks 227 and 230 with respect to the outer gimbal contact 219 due to the linkage comprising the arm 95, connecting link 116 and arm 115 between the ship's rudder and the contact disks. This causes the grounded contact disk 230 to move into contact with the leg 237 of the outer gimbal contact 219 and cause completion of a circuit to ground through the winding of the reversing relay 248 through wires 239, 249 and the contacts 219 and 230. This causes the armatures of the relay 248 to move into contact with the upper and lower central relay contacts to reverse the flow of current through the motor armature and cause reverse rotation of the motor 112 and rudder 113 and the ship will accordingly turn right and cause clockwise rotation of the contact disks until the contact disk 227 again moves into the outer gimbal contact 227 to again cause reversal of the motor and rudder and turning of the ship to the right. It will be evident that the alternate reversal of the steering motor due to the above contact arrangement between the outer gimbal and follow-up linkage from the rudder causes alternate slight turning of the ship in either direction away from and back to the set course.

A new course setting is established in a similar manner as previously described by the transmission of radio signals of different frequency which are picked up by the radio receiver 108. A signal of one frequency or another by the receiver causes energization of one or the other of the windings of relay 243 to establish current flow in one direction or the other through the electromagnetic windings 201 to cause a torque force to be applied between the windings and permanent magnets within the windings. This torque force in one direction or the other is applied between the outer and inner gimbal members and causes precession of the outer gimbal clockwise or counterclockwise about the vertical axis and movement of the gimbal contact 219 into contact with either the contact disk 227 or the contact disk 230. This causes rotation of the steering motor and rudder in either direction to cause the ship to turn right or left to a new course setting on which the ship is maintained by slight rotation of the rudder in either direction from the straight ahead position in the manner previously described.

In the above hunting control system the rate of precession of the gyroscope to set up a new course is varied by adjustment of the rheostat 245 to vary the current flowing in either direction through the windings 201. The use of permanent magnets within these windings provides preselected and substantially constant precession rates of the gyroscope in either direction with small current flow through the windings 201 and therefore minimum leakage flux around these windings which prevents forces being set up between the elements of the gyroscope to cause errors in its action.

It will be evident that the type and arrangement of each of the above described electromagnetic means between the gimbals of each form of gyroscopic means disclosed, enables the magnetic flux path therefrom to be localized. This prevents stray magnetic fields reaching other parts of the gyroscope which would exert magnet force between or eddy currents in these parts which would cause errors in operation of the mechanism. The form and arrangement of each of the electromagnetic precessing means directly between the gimbals also permits substantially constant torque to be applied therebetween throughout the range of free movement permitted between the gimbals and thereby provides the means for obtaining a substantially constant rate of precession. The rheostat provided for varying the current in the windings of each of the electromagnetic means enables the magnetic intensity and flux density to be varied in order to vary the amount of torque exerted and thereby enables preselected and substantially constant values of precession rates to be obtained irrespective of the relative positions of the gimbals.

We claim:

1. A directional gyroscope for controlling steering mechanism comprising a gyroscope rotor supported by gimbals on a frame for normal rotation about a horizontal spin axis, cooperating steering control contacts relatively movable by the gyroscope and steering mechanism with respect to a vertical axis, caging means between the frame and gimbals operable to move the gimbals relative to the frame so that the rotor is moved to a preselected angular position with respect to the frame and to cause the rotor to spin about a horizontal axis, cooperating contacts relatively movable about a vertical axis between the frame and one gimbal for controlling the steering mechanism to maintain a preselected course to travel, certain of said contacts being operably connected to one of said gimbals for rotation upon precession of the gyroscope, other of said contacts being operably connected to the steering gear for rotation thereby to maintain a preselected course of travel, coaxially movable electromagnetic means and permanent magnet means between the gimbals for exerting torque therebetween to cause precession of the rotor and gimbals about a vertical axis to change the course of travel, said last named means comprising at least one permanent magnet secured midway of the poles thereof to one gimbal for coaxial rotation therewith and at least one electromagnet winding secured to the other gimbal in coaxial enclosing relation with respect to said permanent magnet.

2. A directional gyroscope for controlling steering mechanism comprising a gyroscope rotor supported on a frame by gimbals for normal rotation about a horizontal spin axis, cooperating electromagnetic windings and permanent magnets carried by the gimbals for exerting torque directly therebetween in either direction to cause precession of the rotor and gimbals in either direction about a vertical axis, the adjacent ends of said gimbal supporting said permanent magnets and said electromagnetic windings to extend relative torque between the gimbals about the common axis of said gimbals, said windings completely enclosing said permanent magnets and steering control means operable by precession of the gyroscope rotor about a vertical axis.

3. A directional gproscope for controlling steering mechanism comprising a rotor supported for normal rotation about a horizontal spin axis on a frame by gimbals pivoted about vertical and horizontal axes, caging means between the frame and gimbals operable to move the gimbals relative to the frame to preselected positions to cause the rotor axis to be maintained horizontal, cooperating steering control elements carried by the frame and one of the gimbals for rotation about a vertical axis, the control elements carried by the frame being movable upon relative movement of the steering mechanism relative to the rotor and upon operation of the steering mechanism, and electromagnet windings secured on one gimbal and permanent magnets secured on the other gimbal in coaxial relation with the common pivot axis of the gimbals and the axis of the electromagnet windings being disposed transversely with respect to the polar axis of the permanent magnets and enclosing the permanent magnets for exerting torque in either direction therebetween to cause precession of the rotor and gimbal about a vertical axis.

4. A directional gyroscope for controlling steering mechanism comprising a rotor supported in gimbals on a frame for normal rotation about a horizontal spin axis, caging and centering means between the frame and gimbals to move the rotor to its normal position, electromagnetic means comprising cooperating electromagnetic windings and permanent magnets mounted for coaxial relative movement between the gimbals for exerting torque therebetween to cause precession of the rotor and gimbals about a vertical axis, the windings enclosing the permanent magnets and the axes of the windings being disposed normally with respect to the polar axes of the permanent magnets and cooperating steering control elements between the frame and one gimbal operable upon precession.

5. A directional gyroscope for controlling steering mechanism comprising a frame, a first gimbal pivoted about a vertical axis in the frame, a second gimbal pivoted about a horizontal axis in the first gimbal, a rotor supported in the second gimbal for normal rotation about a horizontal axis transverse to the pivot axis thereof, electrically connected electromagnetic windings and permanent magnets cooperating therewith and carried by the gimbals in concentric relation to the axis of the second gimbal for exerting constant pull and torque therebetween to cause constant precession rate of the rotor about a vertical axis throughout the range of movement of the gimbals about their axes, the permanent magnets being disposed entirely within the windings throughout the range of movement of the gimbals, and cooperating steering control and energizing contacts located coaxially with respect to the pivot axis of the first gimbal and between the first gimbal and frame.

6. A directional gyroscope for controlling steering mechanism comprising a frame, a first gimbal pivoted about a vertical axis in the frame, a second gimbal pivoted about a horizontal axis in the first gimbal, a rotor supported in the second gimbal for normal rotation about a horizontal axis transverse to the pivot axis thereof, electromagnetic means comprising cooperating electromagnet windings and permanent magnets carried by the gimbals and located in coaxial relation with the pivot axis of the second gimbal for exerting constant torque between the gimbals to cause constant precession rate of the rotor about a vertical axis throughout the range of movement of the gimbals about their axes, and cooperating steering control and energizing contacts located coaxially with respect to the pivot axis of the first gimbal and between the first gimbal and the frame.

DARL F. CARIS.
WALLACE W. PERKINS.

REFERENCES CITED

The following references are of record in the file of this patent:

UNITED STATES PATENTS

| Number | Name | Date |
|---|---|---|
| 1,545,479 | Boykow | July 14, 1925 |
| 1,896,805 | Sperry, Jr., et al. | Feb. 7, 1933 |
| 2,109,953 | Bates | Mar. 1, 1938 |
| 2,207,850 | Brandt | July 16, 1940 |
| 2,328,670 | Parker | Sept. 7, 1943 |
| 2,410,473 | Weems | Nov. 5, 1946 |
| 2,412,204 | Carter et al. | Dec. 10, 1946 |
| 2,413,739 | White | Jan. 7, 1947 |
| 2,415,819 | Halpert et al. | Feb. 18, 1947 |
| 2,417,573 | Strother | Mar. 18, 1947 |